Nov. 8, 1955 R. C. SEYFORTH 2,723,151
HASP STAPLE
Filed Dec. 4, 1952
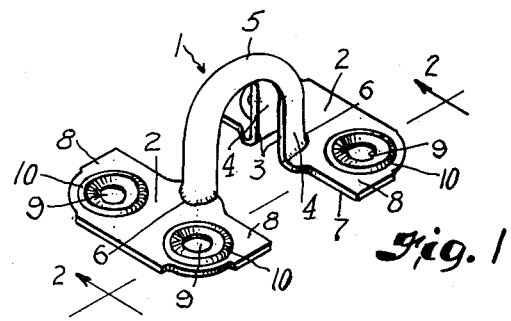
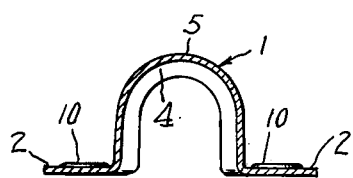
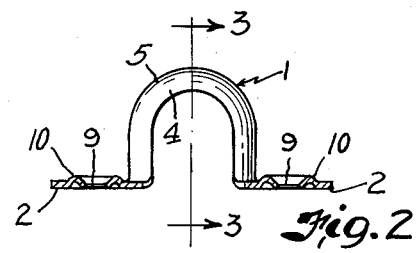
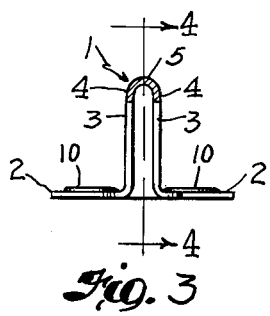
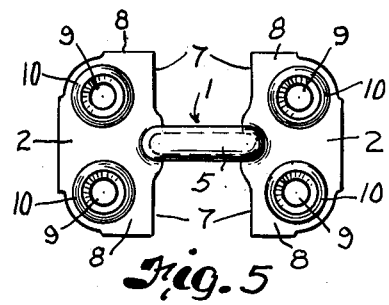
INVENTOR.
ROME C. SEYFORTH
BY
Oberlin + Limbach
ATTORNEYS.

United States Patent Office 2,723,151
Patented Nov. 8, 1955

2,723,151

HASP STAPLE

Rome C. Seyforth, Shelby, Ohio, assignor to The Shelby Metal Products Company, Shelby, Ohio, a corporation of Ohio Application December 4, 1952, Serial No. 324,107

2 Claims. (Cl. 292—340)

The present improvement relating as indicated to staples designed for use with hasps have more particular regard to a staple construction capable of heavy duty use including attaching means affording a positive support for the staple when secured in position operatively to engage an associated hasp.

While hasp staples currently available are of variable construction dependent upon the particular intended applications thereof, those designed for comparatively heavy duty use generally comprise a loop formed of solid round stock and a separately fabricated attaching plate engaged therewith for mounting the loop on a supporting surface. In one form of such a staple, the ends of the loop pass through the attaching plate and are upset, in effect, to rivet the loop directly to the plate, but since the ends secured in this manner project beyond the plate mounting surface, this type of staple may be used conveniently only where the supporting surface readily accommodates such projections. Another form of heavy duty staple has been devised to permit flush mounting thereof, however, this is more complex and requires that the loop be riveted in similar fashion to a separate plate which is then overlaid by the attaching plate.

It is a principal object of my invention to provide a relatively simple and inexpensive hasp staple construction which is at the same time sufficiently strong to serve most if not all uses of such devices. Another object of my invention is to provide a staple of this sort wherein the loop is of superior strength and is provided with unitary attaching portions whereby it may be mounted flush upon a plane supporting surface. Other objects and advantages of the invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a perspective view of my improved hasp staple construction clearly showing the unitary nature thereof;

Fig. 2 is a section of the staple as viewed from the plane of line 2—2 in Fig. 1;

Fig. 3 is a sectional view taken on the plane of line 3—3 in Fig. 2 to illustrate the cross-sectional shape of the loop;

Fig. 4 is a sectional view, the plane of which is indicated by line 4—4 in Fig. 3; and Fig. 5 is a top plan view of the staple.

Referring now to the drawing in detail, my hasp staple consists of a unitary metal stamping of the form shown with a loop portion, indicated generally by the numeral 1, adapted to pass through the eye of an associated hasp, and corresponding attaching plates 2 formed at the respective ends of such loop for mounting the device on a supporting structure.

The loop 1 is conventionally U-shaped, having a longitudinally curved central section and coplanar parallel legs of equal length extending therefrom. Such loop in my construction, however, is uniformly transversely rounded throughout its extent to channel form with edges 3 and immediately adjacent parallel edge portions 4 directed inwardly of the loop, the rounded intermediate portion 5, therefore, providing the loop with an arcuate outer peripheral surface.

Each leg of loop portion 1 merges into the flat, generally rectangular attaching plate 2 associated therewith at the approximate mid-point 6 of a longitudinal edge of such plate, the two plates being arranged in parallel relation within a single plane and extending outwardly at right angles relative to the legs of the loop. The spaced loop edges 3 are respectively continuous with the opposed longitudinal edge sections 7 of the plates projecting to either side of the plane of the loop, which plane is, of course, perpendicular to the plane of the attaching plates.

End portions 8 of the plates 2 are provided with transverse openings 9 for the reception of the attaching elements, generally screws, employed to secure the staple in operative position, and these openings are preferably coined as shown, thereby to provide reinforcing bosses 10 thereabout. Such bosses project slightly above the top surfaces of the plates, effectively forming countersinks for the screws, without, however, impairing the uniformly flat bottom or mounting surfaces thereof.

My improved staple construction, therefore, comprises spaced apart attaching feet or plates integrally formed with a hasp-receiving loop portion in such manner to permit efficient flush mounting of the staple. It will be apparent from the foregoing that this staple may be readily and economically manufactured and yet is of comparatively great strength. The transverse curvature of the loop portion, in addition to increasing the strength thereof, serves the ancillary function of facilitating passage of the loop through the eye of the hasp with which the staple is used.

Other modes of applying the principle of the invention may be employed, change being made as regards the details described, provided the features stated in any of the following claims, or the equivalent of such, be employed.

I therefore particularly point out and distinctly claim as my invention:

1. A hasp staple comprising a loop portion having spaced-apart parallel legs and an intermediate curved longitudinal section therebetween, said loop portion being of uniform U-shape in cross-section throughout its entire length and arranged with the opening thereof facing inwardly of the loop, whereby the outer peripheral surface of such loop portion is transversely rounded to facilitate the passage of the loop portion through the eye of a hasp, and a substantially flat attaching foot formed integrally at the end of each such leg of the loop portion, the two such attaching feet lying in substantially the same plane and extending respectively outwardly relative to the ends of the loop portion.

2. A hasp staple as set forth in claim 1 characterized further in that the two attaching feet are of general rectangular shape and extend in parallel relation at right angles to the plane of the loop portion, each such foot being provided with a plurality of openings for the reception of attaching elements used to secure the staple to a supporting surface therefor.

References Cited in the file of this patent

UNITED STATES PATENTS

| | | |
|---|---|---|
| 702,605 | Voight | June 17, 1902 |
| 714,584 | Keiner | Nov. 25, 1902 |
| 936,802 | Ohnstrand | Oct. 12, 1909 |
| 1,087,763 | Harrigan | Feb. 17, 1914 |
| 1,327,694 | Blye | Jan. 13, 1920 |
| 2,403,065 | Engert | July 2, 1946 |